(12) United States Patent
Giehl et al.

(10) Patent No.: US 11,630,419 B2
(45) Date of Patent: Apr. 18, 2023

(54) DEVICE AND METHOD FOR PRODUCING AN EDGE-LIT-HOLOGRAM, EDGE-LIT-HOLOGRAM AND LIGHTING DEVICE FOR A VEHICLE

(71) Applicant: HELLA GmbH & Co. KGaA, Lippstadt (DE)

(72) Inventors: Markus Giehl, Lippstadt (DE); Fabian Schueler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 581 days.

(21) Appl. No.: 16/721,304

(22) Filed: Dec. 19, 2019

(65) Prior Publication Data

US 2020/0201250 A1 Jun. 25, 2020

(30) Foreign Application Priority Data

Dec. 19, 2018 (DE) ...................... 10 2018 132 790.0

(51) Int. Cl.
*G03H 1/00* (2006.01)
*G03H 1/04* (2006.01)
*F21S 41/00* (2018.01)

(52) U.S. Cl.
CPC ............ *G03H 1/0408* (2013.01); *F21S 41/00* (2018.01); *G03H 1/0005* (2013.01); *G03H 2223/24* (2013.01)

(58) Field of Classification Search
CPC .............. G03H 1/0408; G03H 1/0005; G03H 1/0248; G03H 1/0465; G03H 1/0476;
(Continued)

(56) References Cited

U.S. PATENT DOCUMENTS 5,499,116 A * 3/1996 Wreede ................ B42D 25/328
359/24
7,324,248 B2 1/2008 Brotherton-Ratcliffe et al.
(Continued)

FOREIGN PATENT DOCUMENTS

DE 102007025907 A1 12/2008
DE 10201610721 A1 10/2017
(Continued)

OTHER PUBLICATIONS

Nesbitt (Edgelit holography: extending size and color, MIT Master of Science Thesis, Aug. 6, 1999, pp. 1-96 (Year: 1999).*

*Primary Examiner* — Stephone B Allen
*Assistant Examiner* — Jyotsna V Dabbi
(74) *Attorney, Agent, or Firm* — Muncy, Geissler, Olds & Lowe, P.C.

(57) ABSTRACT

A device for producing an edge-lit-hologram having a light source, in particular a laser light source, for generating a light beam, optical splitter for splitting the light beam generated by the light source into an object beam and a reference beam, imprinter for imprinting computer-generated information pertaining to the edge-lit-hologram to the object, optics for overlapping the object beam and the reference beam on or in a photosensitive recording medium for imprinting the edge-lit-hologram, where the optics include at least one transparent body through which the reference beam enters the photosensitive recording medium during operation of the device. The at least one transparent body shaped and disposed in the device such that the reference beam enters the body at an angle of less than 10° to the normal on the surface of the body or enters the body perpendicular to the surface of the body.

16 Claims, 1 Drawing Sheet

(58) Field of Classification Search
CPC .......... G03H 1/26; G03H 1/0402; G03H 1/10;
G03H 1/0256; G03H 1/0272; G03H
2001/0434; G03H 2001/0439; G03H
2001/0473; G03H 2001/0469; G03H
2001/026; G03H 2001/0208; G03H
2001/0482; G03H 2223/24; G03H
2223/17; G03H 2222/42; G03H
2001/043; G03H 2001/2665; G03H
2210/00; G03H 2210/10; G03H 2210/22;
G03H 2227/05; G03H 2270/00; G03H
2270/21; G03H 2270/32; G03H 2270/55;
F21S 41/00; F21S 41/16; F21W 2102/00;
F21W 2107/10
USPC .......................................... 359/8, 11, 12, 30
See application file for complete search history.

(56) References Cited

U.S. PATENT DOCUMENTS

| 8,097,465 | B2 | 1/2012 | Millington |
| 8,605,562 | B2 * | 12/2013 | Pyun ..................... G11B 7/125 |
| | | | 369/103 |
| 9,104,176 | B2 | 8/2015 | Dausmann et al. |
| 2003/0103868 | A1 | 6/2003 | Millington |

FOREIGN PATENT DOCUMENTS

| EP | 0930549 A1 | 7/1999 | |
| WO | WO9909514 A1 | 2/1999 | |
| WO | WO01/50113 A1 | 7/2001 | |
| WO | WO-2012112678 A1 * | 8/2012 | ............. G03F 7/001 |
| WO | WO-2016113288 A1 * | 7/2016 | ............. B29C 39/24 |

* cited by examiner

DEVICE AND METHOD FOR PRODUCING AN EDGE-LIT-HOLOGRAM, EDGE-LIT-HOLOGRAM AND LIGHTING DEVICE FOR A VEHICLE

This nonprovisional application claims priority under 35 U.S.C. § 119(a) to German Patent Application No. 10 2018 132 790.0, which was filed in Germany on Dec. 19, 2018, and which is herein incorporated by reference.

BACKGROUND OF THE INVENTION

Field of the Invention

The present invention relates to a device for producing an edge-lit-hologram, a method for producing an edge-lit-hologram, an edge-lit-hologram produced by such a method and/or produced with such a device as well as a lighting device for a vehicle with such an edge-lit-hologram.

Description of the Background Art

In the production of edge-lit-holograms, very large angles between the reference beam and the object beam are required because the reconstruction angle of the edge-lit-hologram must be greater than the angle of the total reflection. In the production process, there is a loss of angle between the object wave and the reference wave due to the refraction at the interface formed between the air and the recording medium. In addition, there is a decline in efficiency, because the reflected portion of the reference beam also increases with an increasing angle to the recording medium. Very shallow reconstruction angles are difficult to produce because the refraction of light at the interface to the recording medium does not allow for such angles, or the efficiency of the edge-lit-holograms decreases due to the increasingly reflected portion of the reference beam.

A method and a device of the aforementioned type are known from EP 0 930 549 A1. The device described therein comprises a transparent substrate on which a photosensitive recording medium is disposed. On the side of the substrate facing away from the recording medium is the base of a prism, wherein an immersion liquid is disposed between the base of the prism and the substrate. Through the prism, a reference beam is injected into the substrate, which extends in the recording medium at an angle which is greater than the angle of the total reflection. At the same time, an object beam perpendicularly impinges upon the side of the recording medium facing away from the substrate, so that an edge-lit-hologram is written into the recording medium.

Furthermore, DE 10 2016 107 210 A1 discloses a method and a device for producing a computer-generated hologram, a computer-generated hologram and a lighting device. In the method described therein, a hologram formed of a plurality of sub-holograms is imprinted in a photosensitive recording medium. In this case, the portions of the recording medium corresponding to the individual sub-holograms are successively supplied with an object beam and a reference beam. The object beam is modulated with computer-generated hologram information by a light modulator. The hologram or a hologram replica made with the hologram being the master hologram can be integrated into a headlight of a motor vehicle.

In the production of holograms, the properties of the light source used for the reconstruction play a decisive role. A change in the properties, such as the divergence, of a light source used for the reconstruction of the hologram with respect to the light source used in the production process leads to big changes in the reconstructed image. The same applies to changes in the substrate geometry to which the hologram is applied. Therefore, it is desirable to be able to change the angles of incidence of the reference beam on the recording medium.

The device known from the prior art according to EP 0 930 549 A1 with a prism and an immersion liquid only accepts fixed reference angles and thus does not allow for the production of master holograms with flexible reference angles.

SUMMARY OF THE INVENTION

It is therefore an object of the present invention to provide a method and a device with which flexible edge-lit-holograms can be produced and/or with which edge-lit-holograms with a very large angle between the object beam and the reference beam can be written without loss of reflection or loss of angle. Furthermore, an edge-lit-hologram produced by such a method and/or produced with such a device and a lighting device for a vehicle having such an edge-lit-hologram are to be specified.

According to an exemplary embodiment, it is provided that the at least one transparent body is shaped and arranged in a device such that the reference beam enters the body at an angle of less than 10° to the normal on the surface of the body or enters the body perpendicular to the surface of the body. Thereby, it is possible to at least substantially realize very large angles between the object beam and the reference beam without loss of angle or loss of efficiency, because due to the vertical or substantially vertical entry of the reference beam, no light or only a very small amount of light is refracted at the at least one transparent body and the orientation of the reference beam in the recording medium or of a substrate connected thereto is at least substantially preserved.

There is the possibility that an optical device for overlapping the object beam and the reference beam comprise a reflector, in particular a parabolic reflector, from which the reference beam is reflected onto the at least one transparent body during operation of the device. By means of the reflector, the angle of incidence of the reference beam on the recording medium can be changed by simple means.

It can be provided that the mutually facing surfaces of the reflector on the one hand and the at least one transparent body on the other hand correspond to each other, in particular are similarly shaped, wherein preferably the surface of the reflector facing the at least one transparent body is concave, in particular parabolically concave, and the surface of the at least one transparent body facing the reflector is convex, in particular spherically convex. In this case, the reflector and the transparent body may have a concentric surface design at least partially relative to each other. This way, it can be ensured that the reference beam reflected from the reflector onto the transparent body always impinges perpendicularly on the surface of the transparent body.

There is the possibility that the device comprises a substrate, in particular a transparent substrate, on which the photosensitive recording medium is disposed. The optical device for overlapping the object beam and the reference beam can comprise two transparent bodies for the reference beam through which the reference beam can enter the photosensitive recording medium, wherein the two bodies are arranged in particular on sides of the substrate facing away from each other. Preferably, the device may comprise an immersion agent, in particular an immersion liquid, which is disposed between the at least one transparent body and the photosensitive recording medium or between the at least one transparent body and the substrate. The recording medium can thus be stored together with the substrate in an immersion between two transparent bodies arranged on different sides.

It can be provided that the photosensitive recording medium, in particular together with the substrate, can be moved relative to the at least one transparent body and the reflector. In this case, the at least one transparent body and the reflector can be immovable relative to one another.

There is a possibility that the optical device for overlapping the object beam and the reference beam are formed such that the angle of incidence at which the reference beam impinges upon the surface of a first portion of the recording medium is different from the angle of incidence at which the reference beam is incident on the surface of a second portion of the recording medium, wherein a transition from a first to a second portion can take place by an intermediate movement of the photosensitive recording medium relative to the at least one transparent body and the reflector. This way, individual sub-holograms can be written successively.

In this case, different sub-holograms with different angles of incidence of the reference beam can be read, so that the properties of the light source used in the reconstruction of the edge-lit-hologram and/or the geometry of a substrate can be considered in the writing of the edge-lit-hologram. For example, depending on the divergence of the light source used for the reconstruction or depending on the curvature of the substrate to which the edge-lit-hologram is to be applied, different angles of incidence of the reference beam can be selected for different sub-holograms. In this case, it is possible to almost continuously adjust the angle between the reference beam and the object beam for each sub-hologram, thus creating a prerequisite for curved substrates and allowing for the adaptation to different beam patterns of a variety of light sources.

The at least one transparent body can be shaped and disposed in the device such that the reference beam enters the body at an angle of less than 10° to the normal on the surface of the body or enters the body perpendicular to the surface of the body. The method also allows for realizing very large angles between the object beam and the reference beam at least substantially without loss of angle or loss of efficiency, because due to the vertical or substantially vertical entry of the reference beam, no light or only a very small amount of light is refracted at the at least one transparent body and the orientation of the reference beam in the recording medium or of a substrate connected thereto is at least substantially preserved.

It can be provided that the produced, in particular computer-generated, edge-lit-hologram serves as a master hologram for the production of hologram replicas. For example, the hologram replicas can be read into a thin flexible film. This film can then be applied, for example, to a curved surface of a lighting device, in particular a headlight.

The edge-lit-hologram, in particular the hologram replica, can be produced with a device according to the invention and/or by a method of the invention, wherein the edge-lit-hologram is provided in particular for the application to a curved surface and/or for use with a light source having a predetermined divergence.

The lighting device for a vehicle, in particular the headlight for a vehicle, comprises an inventive edge-lit-hologram, wherein the lighting device comprises in particular a curved surface on which the edge-lit-hologram is disposed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the illustrated embodiment, an edge-lit-hologram composed of a plurality of sub-holograms is to be imprinted into a photosensitive recording medium 1 shown only schematically. The sub-holograms can be arranged side by side in a two-dimensional matrix in an x- and a y-direction.

Photosensitive recording media 1 may be formed of conventional media used in the generation of holograms. The recording medium 1 may, for example, be formed as a film that is disposed on a transparent substrate 7, e.g., is laminated onto the substrate 7. The substrate 7 may be, for example, a glass or plastic substrate. The photosensitive recording medium 1 has a planar surface and extends in an x-y plane.

Figure 1:
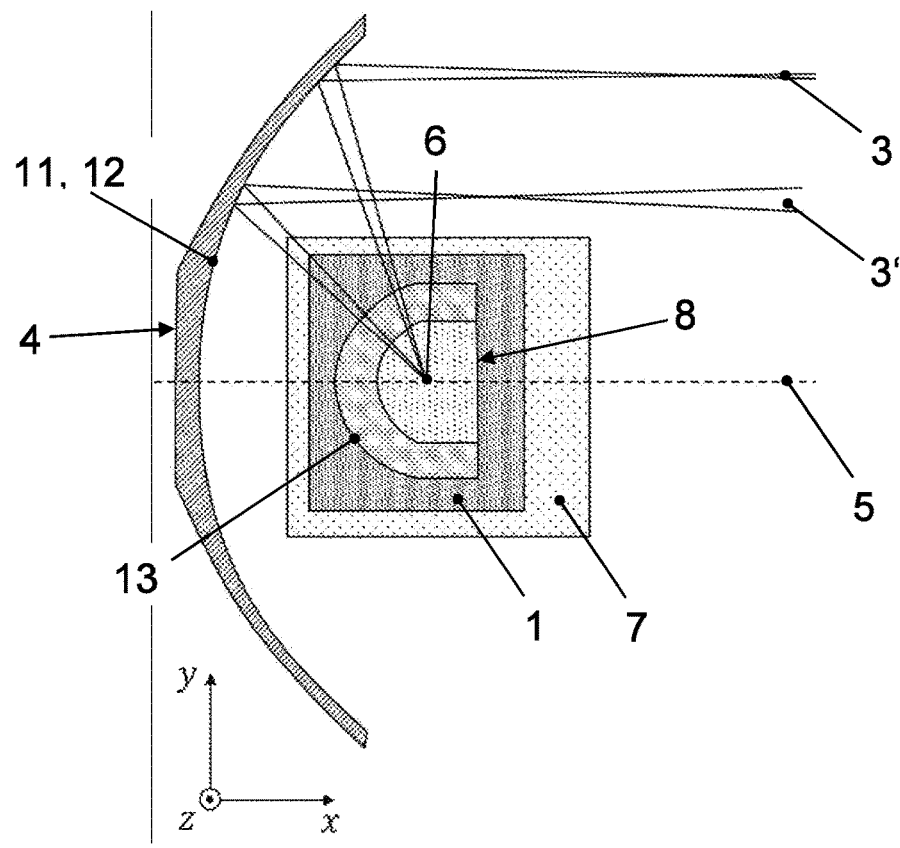
FIG. 1 is a schematic plan view of a part of a device according to the invention.

The embodiment of a device according to the invention partially shown schematically in FIG. 1 further comprises a laser light source, which generates a laser beam split by an optical splitter into an object beam 2 and a reference beam 3. The device further comprises a modulater, which may be formed as an LC display in a reflection arrangement. The LC display can be controlled as a function of computer-generated data, which relates to the creation of individual sub-holograms.

The object beam 2 can be widened onto the LC display by optics. As a function of the data controlling the LC display, the LC display can change the phase of parts of the object beam 2 during the reflection, so that parts of the object beam 2 undergo a phase shift relative to other parts of the object beam 2. As a result, the object beam 2 is imprinted with information pertaining to a sub-hologram.

The device further comprises a parabolic reflector 4 facing the photosensitive recording medium 1. In this case, the optical axis 5 of the reflector 4 extends in the x-direction through the x-y plane of the planar surface of the recording medium 1. In particular, the focal point 6 of the parabolic reflector 4 is in the x-y plane of the planar surface of the recording medium 1.

Figure 2:
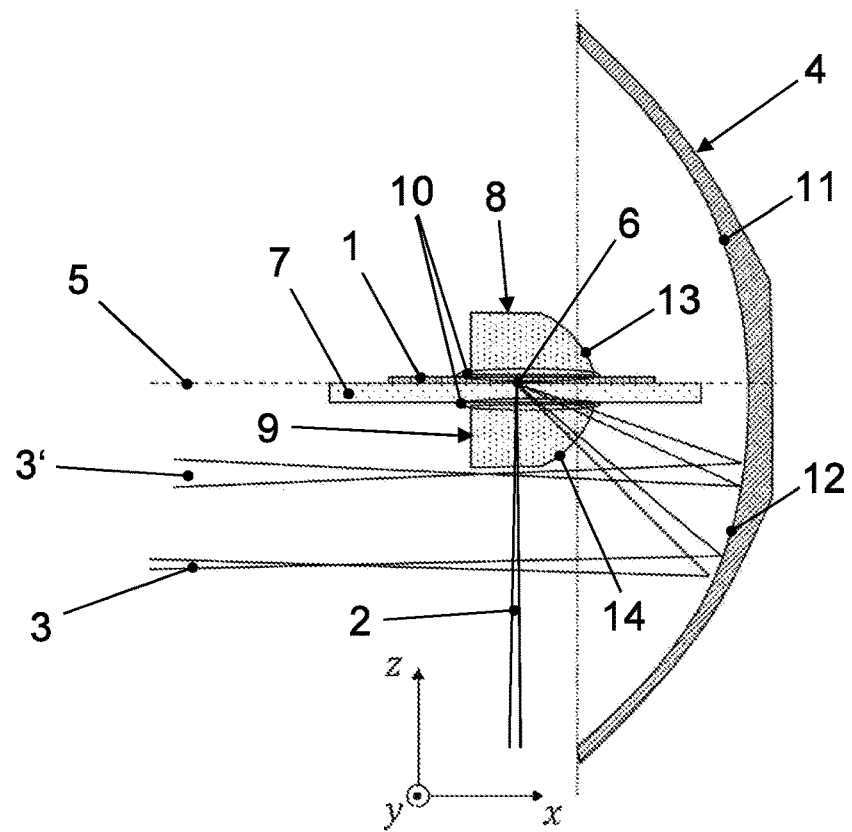
FIG. 2 is a schematic side view of the part of the inventive device according to FIG. 1.

Laser beams extending parallel to the optical axis of the parabolic reflector 4, or in the x-direction in FIG. 2, are focused to the focal point 6 of the parabolic reflector 4, wherein the angle at which they enter the photosensitive recording medium 1 is dependent on the position in which they impinge upon the reflector 4.

FIG. 2 displays two exemplary reference beams 3, 3', each of which impinge on the reflector 4 in the x-direction and are spaced at a different distance from the optical axis 5 of the reflector 4. Accordingly, also the angle at which they impinge on the recording medium 1 is different.

The reference beam 3 impinging on the reflector 4 far below the optical axis 5 in FIG. 2 is incident on the surface of the recording medium 1 at a larger angle of incidence to the x-y plane than the reference beam 3' in FIG. 2 impinging on the reflector 4 further up or closer to the optical axis 5. A variation of the position of the reference beam 3, 3' thus results in a change in the angle of incidence at which the reference beam 3, 3' impinges on the recording medium 1 and thus also in a change in the orientation of the Bragg planes in the edge-lit-hologram as well as in a change in the angle of incidence at which the edge-lit-hologram can later be reconstructed.

The object beam 2 is not reflected at the reflector 4 but moves in FIG. 2 in the positive z-direction upward directly into the recording medium 1 and is superimposed there with the reference beam 3, 3'. By interference with the reference beam 3, 3', an edge-lit-hologram is written into the photosensitive recording medium 1 in a conventional manner.

The device further comprises two transparent bodies 8, 9, one of which is arranged above the recording medium 1 and one below the substrate 7. The transparent bodies 8, 9 are connected to the substrate 7 or the recording medium 1 by means of an immersion agent 10, for example an immersion liquid having a suitable refractive index.

The surfaces 11, 12 of the reflector 4 facing the transparent bodies 8, 9 on the one hand and the surfaces 13, 14 of the transparent bodies 8, 9 facing the reflector 4 on the other hand correspond with each other and are similarly shaped. For example, the surfaces 11, 12 of the reflector 4 facing the transparent bodies 8, 9 are parabolically concave and the surfaces 13, 14 of the transparent body 8, 9 facing the reflector 4 are spherically convex. In particular, the reflector 4 and the transparent bodies 8, 9 may have the same curvatures at least in sections and a surface design which is concentric relative to one another.

In embodiments in which the shape of the reflector 4 is not parabolic, the surfaces 13, 14 of the transparent bodies 8, 9 can have a curvature which deviates from a spherical design, in particular a free form.

The mutually corresponding shapes of the surfaces 11, 12 of the reflector 4 facing the transparent bodies 8, 9 on the one hand and the surfaces 13, 14 of the transparent bodies 8, 9 facing the reflector 4 on the other hand ensure that reference beams 3, 3' reflected from the reflector 4 on the transparent body 8, 9 always vertically impinge on the surface of the transparent bodies 8, 9.

By the vertical impact of the reference beam 3, 3' on the surfaces of the transparent bodies 8, 9, there is no or only a very small refraction of light when the reference beam 3, 3' enters the transparent body 8, 9. Furthermore, due to the refractive index matching to the substrate 7 and the recording medium 1, the orientation or the angle of incidence of the reference beam 3, 3' in the recording medium 1 and the associated substrate 7 are at least substantially maintained. This makes it possible to realize very large angles between the object beam 2 and the reference beam 3, 3' at least substantially without loss of angle or loss of efficiency.

The recording medium 1 is slidably mounted together with the substrate 7 in an x-y plane in the focal point of the reflector 4. For this purpose, suitable adjuster for moving the photosensitive recording medium 1 and the substrate 7 are provided. The substrate 7 can slide together with the recording medium 1 between the transparent bodies 8, 9. The transparent bodies 8, 9 themselves are firmly and immovably aligned with the parabolic reflector 4.

The reflector 4 takes on two functions. On the one hand it serves to focus the reference beam 3, 3' on or into the recording medium 1 and on the other hand it enables a change in the angle of incidence of the reference beam 3, 3'.

For producing the edge-lit-holograms, the recording medium 1 can be positioned in the x-y plane such that the object beam 2 and the reference beam 3, 3' overlap on a first portion of the surface of the recording medium 1 so as to imprint a first sub-hologram. For this purpose, the object beam 2 is imprinted with the information pertaining to the first sub-hologram.

After reading the first sub-hologram, the recording medium 1 is displaced together with the substrate 7 in the x-y plane until the object beam 2 and the reference beam 3, 3' overlap on a second portion of the surface of the recording medium 1 so as to imprint a second sub-hologram. For this purpose, the object beam 2 is imprinted with the information pertaining to the second sub-hologram.

This way, all sub-holograms are gradually read into the recording medium 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for producing an edge-lit-hologram, the device comprising:
    a light source or a laser light source to generate a light beam;
    an optical splitter to split the light beam generated by the light source into an object beam and a reference beam;
    an imprinter to imprint, to the object beam, computer-generated information pertaining to the edge-lit-hologram; and
    optics for overlapping the object beam and the reference beam on or in a photosensitive recording medium for imprinting the edge-lit-hologram,
    wherein the optics comprise at least one transparent body through which the reference beam enters the photosensitive recording medium during operation of the device,
    wherein the at least one transparent body is shaped and disposed in the device such that the reference beam enters the at least one transparent body at an angle of less than 10° to the normal on a surface of the at least one transparent body or enters the at least one transparent body perpendicular to the surface of the at least one transparent body, and
    wherein the device further comprises a transparent substrate on which the photosensitive recording medium is disposed, the transparent substrate being positioned between the at least one transparent body and the photosensitive recording medium.

2. The device according to claim 1, wherein the optics for overlapping the object beam and the reference beam further comprises a reflector from which the reference beam is reflected onto the at least one transparent body during operation of the device, the reflector being a concave parabolic reflector.

3. The device according to claim 2, wherein mutually facing surfaces of the reflector and the at least one transparent body correspond to each other or are similarly shaped, wherein a surface of the reflector facing the at least one transparent body is concave or parabolically concave, and wherein the surface of the at least one transparent body facing the reflector is convex or spherically convex.

4. The device according to claim 1, wherein the at least one transparent body comprises two transparent bodies through which the reference beam is adapted to enter the photosensitive recording medium, wherein the two transparent bodies are disposed on sides of the transparent substrate facing away from each other.

5. The device according to claim 1, further comprising an immersion agent or an immersion liquid, which is disposed between the at least one transparent body and the photosensitive recording medium or between the at least one transparent body and the transparent substrate.

6. The device according to claim 1, wherein the optics for overlapping the object beam and the reference beam further comprises a reflector, and wherein the photosensitive recording medium together with the transparent substrate are adapted to be moved relative to the at least one transparent body and the reflector.

7. The device according to claim 1, wherein the optics for overlapping the object beam and the reference beam are designed such that an angle of incidence at which the reference beam impinges upon a surface of a first portion of the recording medium is different from an angle of incidence at which the reference beam impinges upon a surface of a second portion of the recording medium.

8. A method for producing an edge-lit-hologram using the device according to claim 1, the method comprising:
providing the photosensitive recording medium on the transparent substrate, so that the transparent substrate is positioned between the at least one transparent body and the photosensitive recording medium;
generating the reference beam;
generating the object beam;
imprinting computer-generated information pertaining to the edge-lit-hologram to the object beam; and
overlapping the object beam and the reference beam on or in the photosensitive recording medium for imprinting the edge-lit-hologram,
wherein the optics include the at least one transparent body through which the reference beam enters the photosensitive recording medium, and
wherein the at least one transparent body is shaped and disposed in the device such that the reference beam enters the at least one transparent body at an angle of less than 10° to the normal on the surface of the at least one transparent body or enters the at least one transparent body perpendicular to the surface of the at least one transparent body.

9. The method according to claim 8, wherein successively a plurality of portions of the photosensitive recording medium are simultaneously impinged upon with the object beam and the reference beam to produce a plurality of sub-holograms, wherein an angle of incidence at which the reference beam impinges on a surface of a first portion of the recording medium is different from an angle of incidence at which the reference beam impinges on a surface of a second portion of the recording medium.

10. The method according to claim 8, wherein the photosensitive recording medium is moved between an exposure with the object beam and the reference beam for generating a first sub-hologram at the first portion of the recording medium and an exposure with the object beam and the reference beam for generating a second sub-hologram at a second portion of the recording medium in a plane parallel to the planar surface of the recording medium.

11. The method according to claim 10, wherein the optics for overlapping the object beam and the reference beam further comprises a reflector, and wherein the photosensitive recording medium together with the transparent substrate is moved relative to the at least one transparent body and the reflector.

12. The method according to claim 8, wherein the produced edge-lit-hologram serves as a master hologram for the production of hologram replicas.

13. An edge-lit hologram, produced with a device according to claim 1, wherein the edge-lit-hologram is provided to a curved surface and for use with a light source having a predetermined divergence.

14. A lighting device for a vehicle comprising the edge-lit-hologram according to claim 13, wherein the lighting device includes a curved surface on which the edge-lit-hologram is disposed.

15. The method according to claim 8, wherein the edge-lit-hologram is a computer-generated edge-lit-hologram.

16. The device according to claim 1, wherein the edge-lit-hologram is a computer-generated edge-lit-hologram.

* * * * *